United States Patent [19]
Suzuki et al.

[11] Patent Number: 5,594,666
[45] Date of Patent: Jan. 14, 1997

[54] MASS FLOW CONTROL SYSTEM

[75] Inventors: Isao Suzuki; Taisei Amano, both of Tokyo, Japan

[73] Assignee: MKS Japan, Inc., Tokyo, Japan

[21] Appl. No.: 358,468

[22] Filed: Dec. 19, 1994

[30] Foreign Application Priority Data

Dec. 20, 1993 [JP] Japan .................................... 5-344565

[51] Int. Cl.⁶ ..................................................... G01F 25/00
[52] U.S. Cl. ................ 364/571.01; 364/510; 364/571.04; 364/571.07
[58] Field of Search ................................. 73/204.15, 861; 364/510, 571.01, 571.04, 571.07

[56] References Cited

U.S. PATENT DOCUMENTS

| | | | |
|---|---|---|---|
| 4,527,557 | 7/1985 | DeVries et al. | 128/204.23 |
| 5,263,369 | 11/1993 | Cutler | 73/204.15 |
| 5,329,966 | 7/1994 | Fenimore et al. | 137/613 |
| 5,469,750 | 11/1995 | Lloyd et al. | 73/861.61 |
| 5,474,062 | 12/1995 | DeVries et al. | 128/205.24 |
| 5,494,028 | 2/1996 | DeVries et al. | 128/205.24 |

*Primary Examiner*—Edward R. Cosimano
*Attorney, Agent, or Firm*—Wenderoth, Lind & Ponack

[57] ABSTRACT

A mass flow controller includes a photoelectric transducer for receiving information through an optical fiber and an electro-optical transducer for transmitting the result of detection of the mass flow through the optical fiber, thereby transmitting and receiving information through the optical fiber. Accordingly, the transmission and reception of data between the host computer and the mass flow controller performed through the optical fiber are not affected by electro-magnetic noise. Further, the mass flow controller can include a correction device responsive to a command from the host computer for correcting the result of a detection, to thereby accurately process the result of the detection because the result of the detection is corrected as required and then transmitted to the host computer as the correct data.

7 Claims, 6 Drawing Sheets

MASS FLOW CONTROL SYSTEM

BACKGROUND OF THE INVENTION

The present invention relates to an improvement of a mass flow control system.

Figure 1:
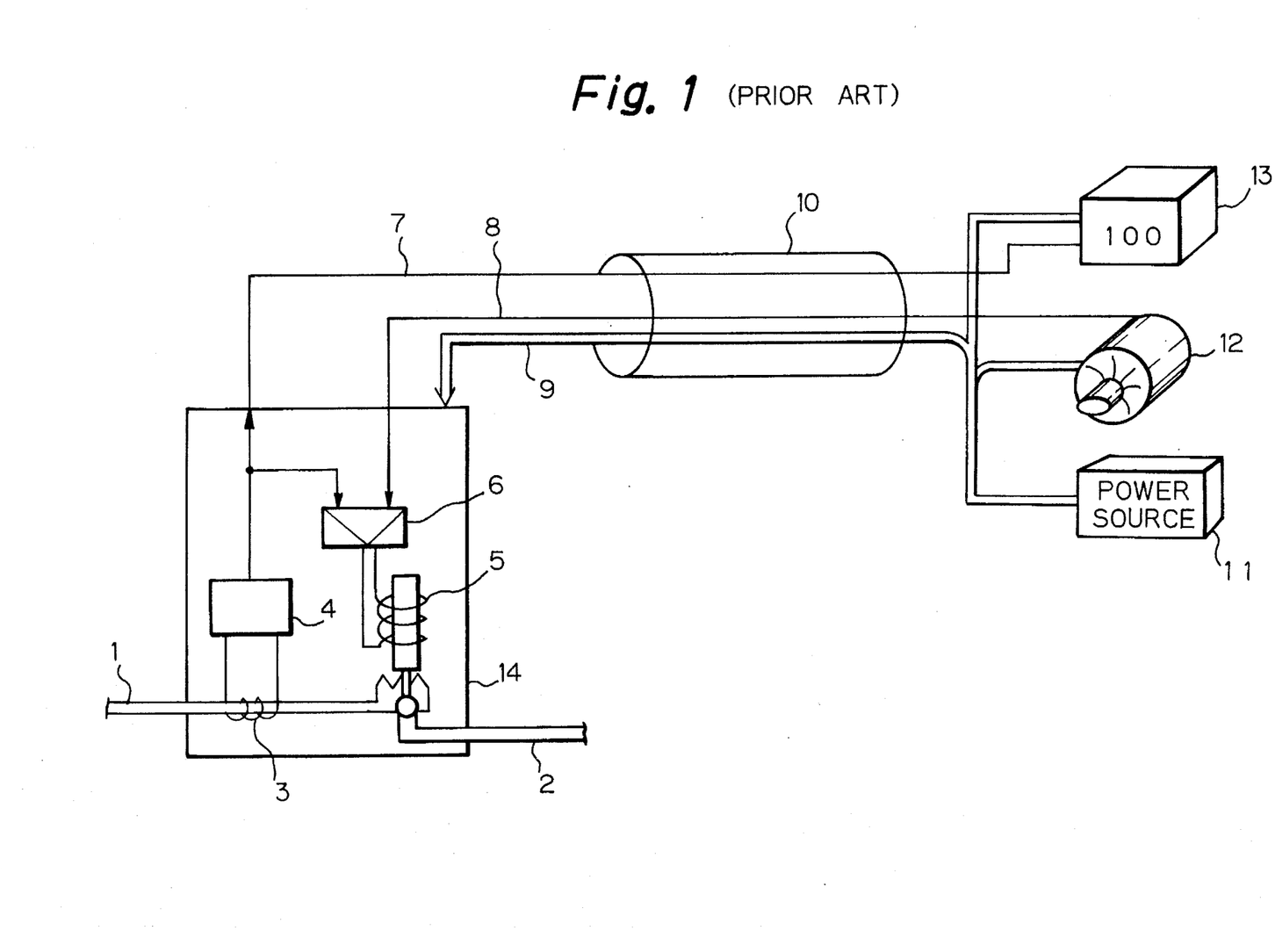
FIG. 1 is a block diagram of a flow control system consisting of a conventional mass flow controller.

A mass flow controller is conventionally constructed as shown in FIG. 1. That is, a gas flowing through a gas inlet pipe 1 is discharged through a mass flow controller 14 into a gas outlet pipe 2 as a flow of the desired mass. The gas inlet pipe 1 has a sensor heater 3 wound thereabout, which in conjunction with a resistance in a sensor circuit 4, forms a bridge circuit. When the resistance of the sensor heater 3 is changed by the heat removing function of the gas flowing through the gas inlet pipe 1, to thereby unbalance the bridge circuit, the voltage of the bridge circuit is derived from the sensor circuit 4 and sent to a flow indicator 13 through a signal line 7.

On the other hand, a signal concerning the flow which is preset by a flow setter 12 is sent through a signal line 8 to a comparator 6, by which it is compared with an actual flow signal provided by the sensor circuit 4, and an output corresponding to the result of the comparison is provided to a valve operating unit 5. In response to the output from the comparator 6, the valve operating unit 5 controls the valve opening so that the gas of the desired mass flows through the valve. The mass flow controller 14 is supplied with electric power from the power source 11 through a power line 9.

However, in the conventional mass flow controller in which signals are sent and received through a cable 10, the signals are easily affected by electromagnetic noise. Particularly in the signal lines, since the signals are transmitted at a voltage as low as 0–5 volts, they are readily disturbed by the noise which causes the actual flow to be indicated erroneously, or sometimes noise becomes mixed in the flow signal and prevents the flow control from being performed properly. In the case where an error arises in the flow to be measured as a result of the advanced age of the sensor, data according to an erroneous signal is indicated as it is and, when it is necessary to input the data to a computer, the erroneous data is provided to the computer. In the case where a plurality of kinds of gases are to be used alternately, the fact that the sensitivity of the sensor varies with the kind of the gas necessitates that the gain of the sensor circuit 4 or the sensitivity of the indicator be changed each time the gas is changed. Further, in the case where a plurality of mass flow controllers are used to construct a system in which they are controlled by a single host computer, the thickness and weight of the cable increases in proportion to the number of the mass flow controllers used, thereby hindering the movement of the operator or requiring additional space to acommodate the cable.

SUMMARY OF THE INVENTION

Accordingly, an object of the present invention is to provide a mass flow controller which is resistant to electromagnetic noise, easy to maintain, and capable of measuring and controlling the mass flow with high stability and accuracy.

Another object of the present invention is to provide a mass flow controller which requires only limited space for connection with control devices such as electronic computers.

The mass flow controller according to the present invention comprises a photoelectric transducer which receives information through an optical fiber and an electro-optical transducer which transmits the result of mass flow detection through the optical fiber, for transmitting and receiving information through the optical fiber. Thus, transmission and reception of data between the host computer and the mass flow controller, according to the present invention, are performed through the optical fiber are not affected by electromagnetic noise, thereby making accurate control and measurement possible. Further, since the optical fiber is much thinner than the cable for transmitting electric signals and requires only a very limited space for wiring, use of such optical fiber is very preferable in construction of a system having a plurality of mass flow controllers and a host computer.

Further, the mass flow controller according to the present invention may include an electro-optical transducer for transmitting data to the host computer through an optical fiber, a photoelectric transducer for receiving a command from the host computer through the optical fiber, and correction means responsive to the command for correcting the result of the detection, to thereby transmit the corrected data to the host computer through the optical fiber. Thus, in addition to the use of the optical fiber which provides advantages such as the elimination of the effects caused by electromagnetic noise and the small space required for wiring, the provision of the correction means which corrects the detection result as required and transmits the correct data to the host computer, makes it possible to process the detection result accurately and properly.

According to one embodiment of the present invention, the correction means includes a number of correction conversion tables for storing the correction data for a plurality of kinds of fluids, respectively, for correction of the detection result responsive to the command and in accordance with the correction data of the correction conversion table corresponding to the predetermined fluid. Accordingly, the present invention makes it possible to provide an accurate detection result corresponding to the kind of the mass fluids to be measured or controlled.

According to another embodiment of the present invention, the correction means includes memory means storing as a zero adjustment value the detection result by the detection means when the flow of the fluid is zero, for correction of the detection result responsive to the command. Accordingly, even when there are errors due to inaccuracy of the sensor which is caused as a result of aging, the present invention makes it possible to provide an accurate detection result through the zero adjustment.

According to still another embodiment of the present invention, the mass flow control system includes detection means for detecting the mass flow, a first casing for housing an analog circuit having flow control means which controls the flow of the fluid according to a preset input and the result of a detection by the detection means. A second casing is provided for housing a photoelectric mutual transducer, an analog-digital mutual converter and digital data processing means. The first casing and the second casing are electrically interconnectable. Thus, the first casing which is a conventional mass flow controller and the second casing which constitutes the mass flow controller, according to the present invention, are provided separately but electrically interconnectably, to thereby make it possible to properly measure the flow by using a conventional system.

DETAILED DESCRIPTION OF PREFERRED EMBODIMENT

Referring now to the drawings attached hereto, a preferred embodiment of the mass flow controller according to the present invention will be described in detail. Throughout the drawings the same numerals are used to designate the same or similar parts and to avoid needless repetition of a description thereof.

Figure 2:
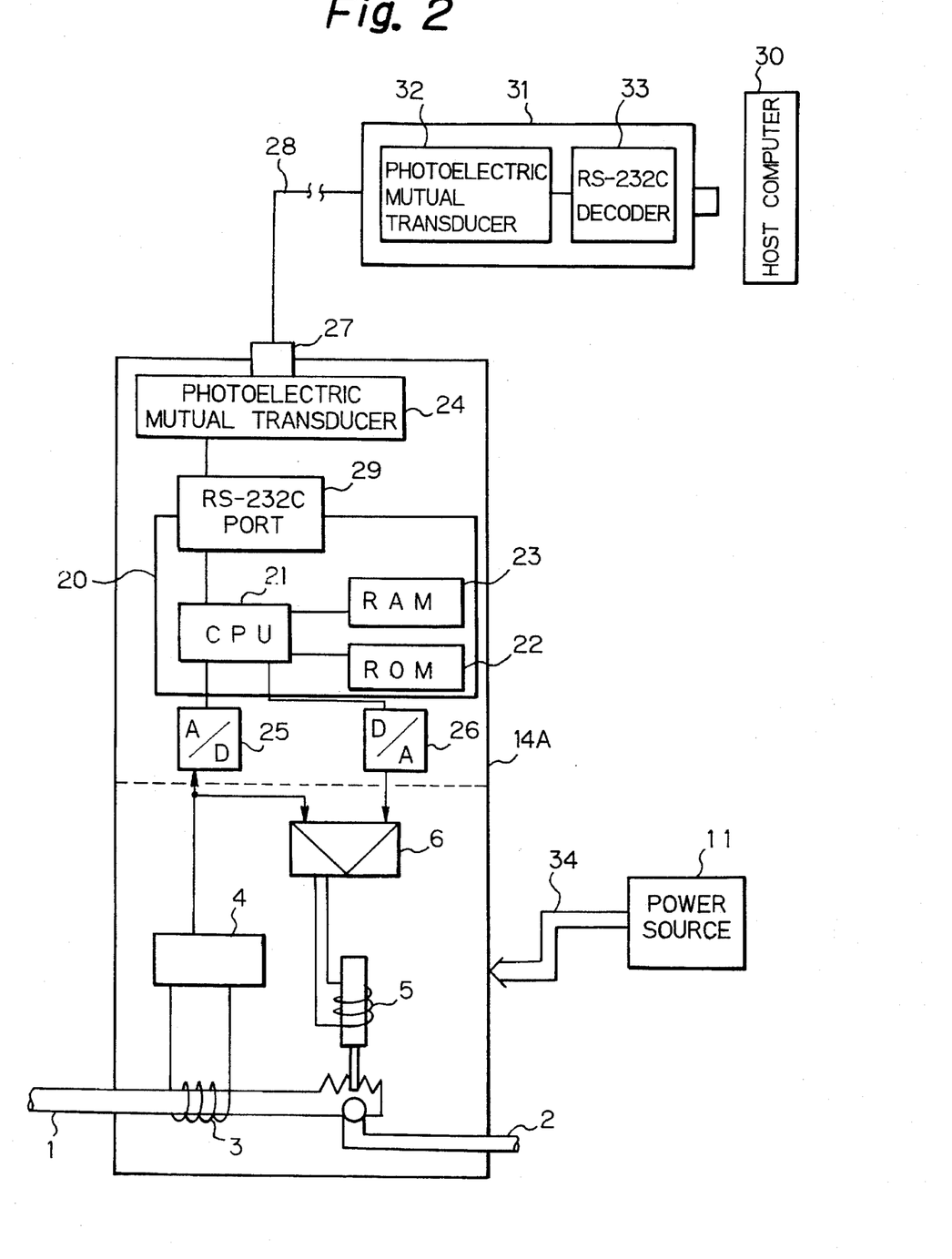
FIG. 2 is a block diagram of a flow control system consisting of a mass flow controller according to a first embodiment of the present invention.

In FIG. 2, there is shown a flow control system consisting of a mass flow controller 14A according to the preferred embodiment of the present invention which has the conventional mass flow controller 14 incorporated in the portion lower than the dashed line. In the mass flow controller 14A, an output of a sensor circuit 4 is digitized by an A/D converter 25 and provided to a CPU 21 of a control unit 20. Further, the CPU 21 transmits preset flow data in digital which is analogized by a D/A converter 26 and provided to a comparator 6. As the control unit 20, use can be made of, for example, Intel's one-chip microcomputer "8031" including therein the CPU (processor) 21, ROM 22, RAM 23 and RS-232C port 29.

Figure 3:
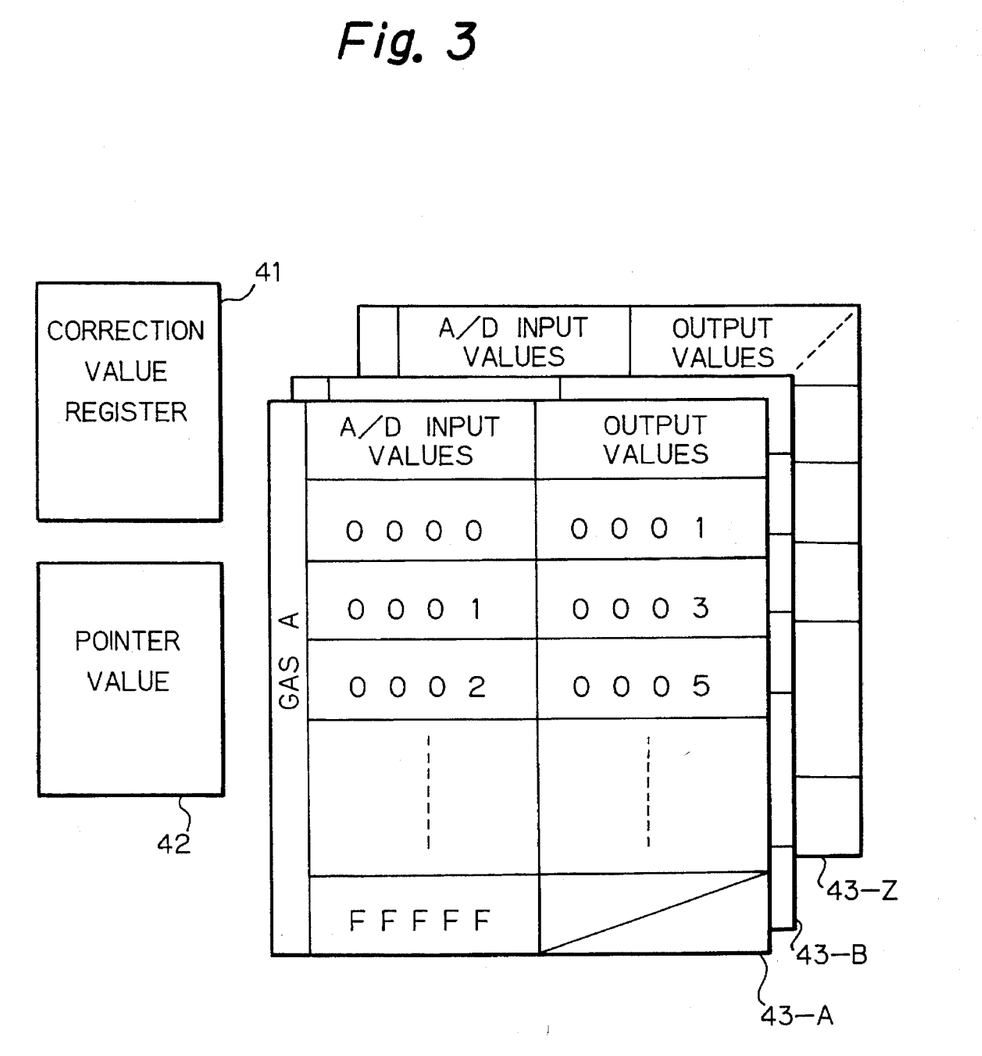
FIG. 3 is a block diagram of essential portions of the mass flow controller according to the first embodiment of the present invention.

Besides flow control programs, the ROM 22 is provided with conversion tables 43-A, 43-B, . . . , 43-Z as shown in FIG. 3, for obtaining output values corresponding to the kinds of gases in response to the input values from the A/D converter 25. Accordingly, when the kind of gas is "A", the output value is obtained from the conversion table 43-A, and when the kind of gas is "B", the output value is obtained from the conversion table 43-B. The RAM 23 is used as a working memory and provided with a correction value register 41 and a pointer 42 for indicating the conversion table corresponding to the kind of gas as shown in FIG. 3. The output of the sensor circuit 4 when the flow is zero is obtained, and then a correction value corresponding to the output is obtained and set in the correction value register 41. For example, if an output "0003" is obtained when the flow is zero, the correction value "–0003" is set in the register 41 as the value when the value "0003" is naturally obtained.

The CPU 21 has the RS-232C port 29 connected thereto, for transmitting and receiving the command/data therethrough. Connected to the RS-232C port 29 is a photoelectric mutual transducer 24 by which the measured flow data output from the control unit 20 is converted from an electric signal into a light signal and provided to a connector 31 through an optical fiber connector 27 and an optical fiber 28. The connector 31 comprises a photoelectric mutual transducer 32 by which the light signal is converted into an electric signal. The measured flow data in this electric signal is decoded by RS-232C decoder 33 and provided to a host computer 30 for necessary processes.

On the other hand, the host computer 30 transmits a command which designates the input or set flow and the kind of gas. This command is converted through the RS-232C decoder 33 into a signal relative to the RS-232C and is provided to the photoelectric mutual transducer 32 which converts it into a light signal and transmits it to the photoelectric mutual transducer 24 through the optical fiber 28 and the optical fiber connector 27. By the photoelectric mutual transducer 24 the light signal is converted into an electric signal and provided to the RS-232C port 29. Thus, the command, which is now in the form of the electric signal, is received by the CPU 21 through the RS-232C port 29 for necessary processes. Photocouplers for optical communication may be used as the photoelectric mutual transducers 24 and 32. The power for the mass flow controller 14A is supplied by a power source 11 through a power source line 34.

Figure 4:
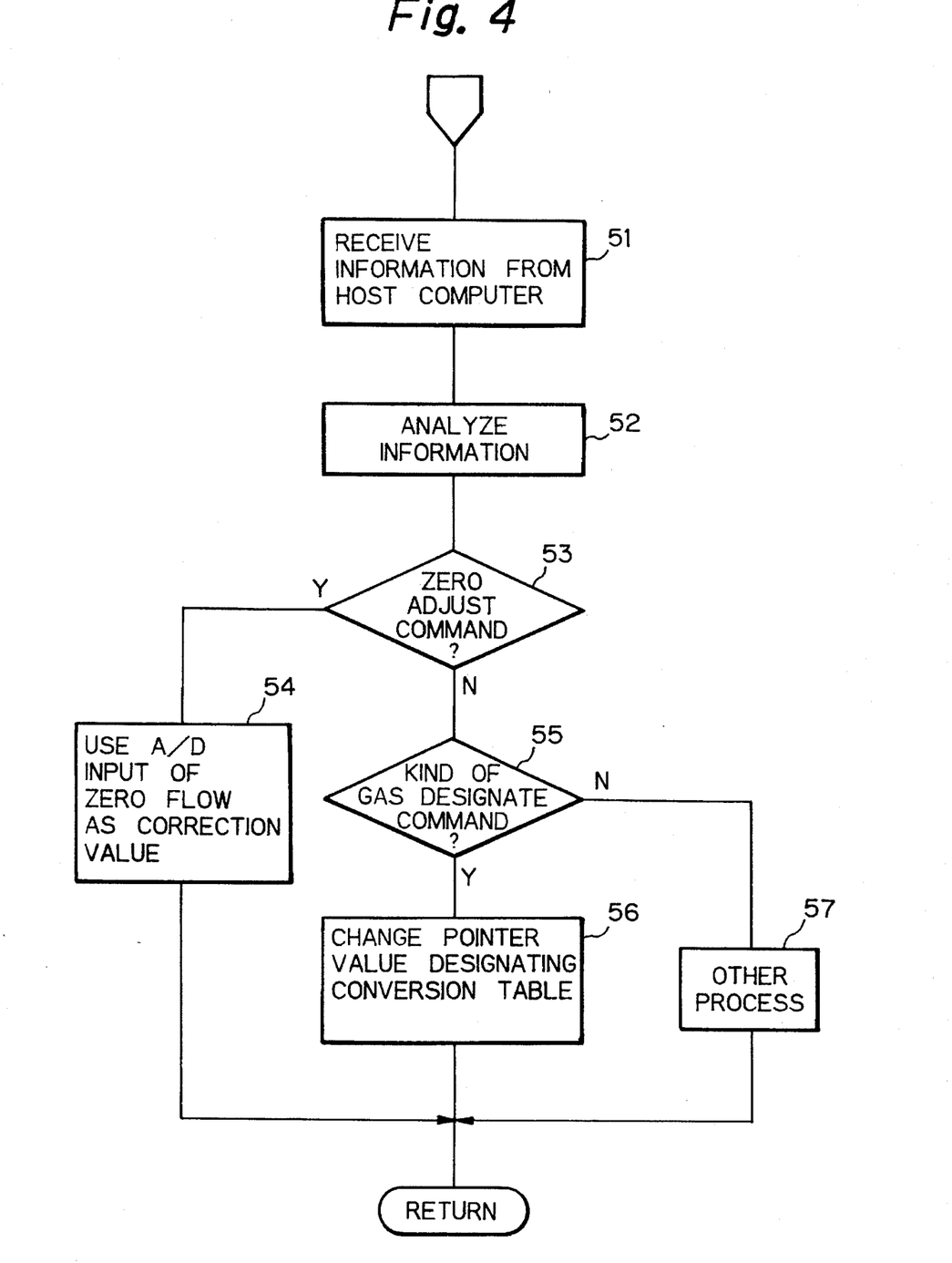
FIG. 4 is a flow chart of the operation of the mass flow controller according to the first embodiment of the present invention.

FIG. 4 is a flow chart showing the processes to be performed by the CPU 21 in accordance with the command from the host computer 30. The program corresponding to this flow chart is stored in the ROM 22. The CPU 21 receives information transmitted from the host computer 30 through the RS-232C port 29 (step 51) and analyzes it (step 52). Then, the CPU checks it to determine whether it is a zero adjust command or not (step 53). If it is not the zero adjust command, the CPU 21 checks whether it is a kind of gas designate command or not (step 55). If it is not the kind of gas designate command, the CPU 21 performs other processes such as, for example, corresponding to another command for transmitting necessary drive data to the D/A converter 26 (step 57) and then returns to the main sequence or program for controlling a mass flow control system 14A.

On the other hand, if the kind of gas designate command is received from the host computer 30 at the step 55, the operation proceeds to step 56, at which a pointer value indicating the conversion table for the designated kind of gas is set at the pointer 42. Normally, the CPU 21 receives outputs from the A/D converter 25 and transmits them to the host computer 30 as the actual flow data at predetermined timing. When performing this process, the CPU 21 refers to the pointer 42, searches for the conversion table corresponding to the value indicated on the pointer 42, obtains the output value corresponding to the input value from the A/D converter 25, corrects it in accordance with the correction value stored in the register 41, and transmits it as the actual flow data. As shown in FIG. 4, after step 56 has been performed, the subroutine is terminated, and the operation returns to the main control program.

The host computer 30 is provided with a zero adjust command for correction of the output value of the mass flow controller 14A when it shows any abnormality. Before this command is transmitted, the gas supply must be stopped. When this command is received by the CPU 21 at step 53, the operation proceeds to step 54 at which data is sent to the D/A converter 26 to close the value. At this time, the output of the sensor circuit 4 must be zero. In most cases, however, an offset value is output by one of some other factors, in which case a correction value obtained in accordance with this output value is set in the correction value register 41. As shown in FIG. 4, after step 54 has been performed, the subroutine terminates, and returns to the main control program.

Figure 5:
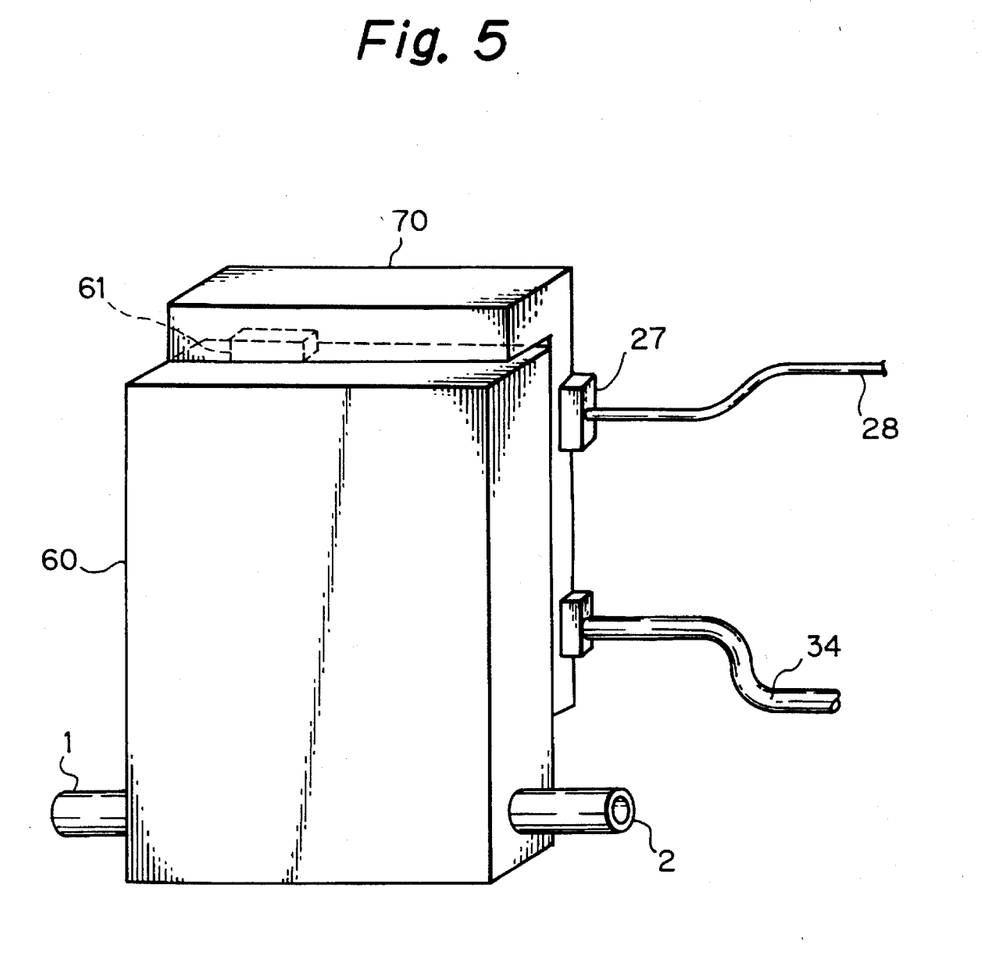
FIG. 5 is a perspective view of the mass flow controller according to a second embodiment of the present invention.

FIG. 5 shows the mass flow controller according to another embodiment of the present invention, in which the construction of the portion below the dashed line in FIG. 2 is the same as the conventional mass flow controller (denoted by 14 in FIG. 1) the mass flow controller 14 is housed in a casing 60, and the rest of the mass flow controller 14A is housed in a casing 70. A connector 61 is provided for connection between the sensor circuit 4 and the A/D converter 25 and connection between the D/A converter 26 and the comparator 6. The casings 60 and 70 are connected by suitable engaging means such as a concave-convex configuration.

Figure 6:
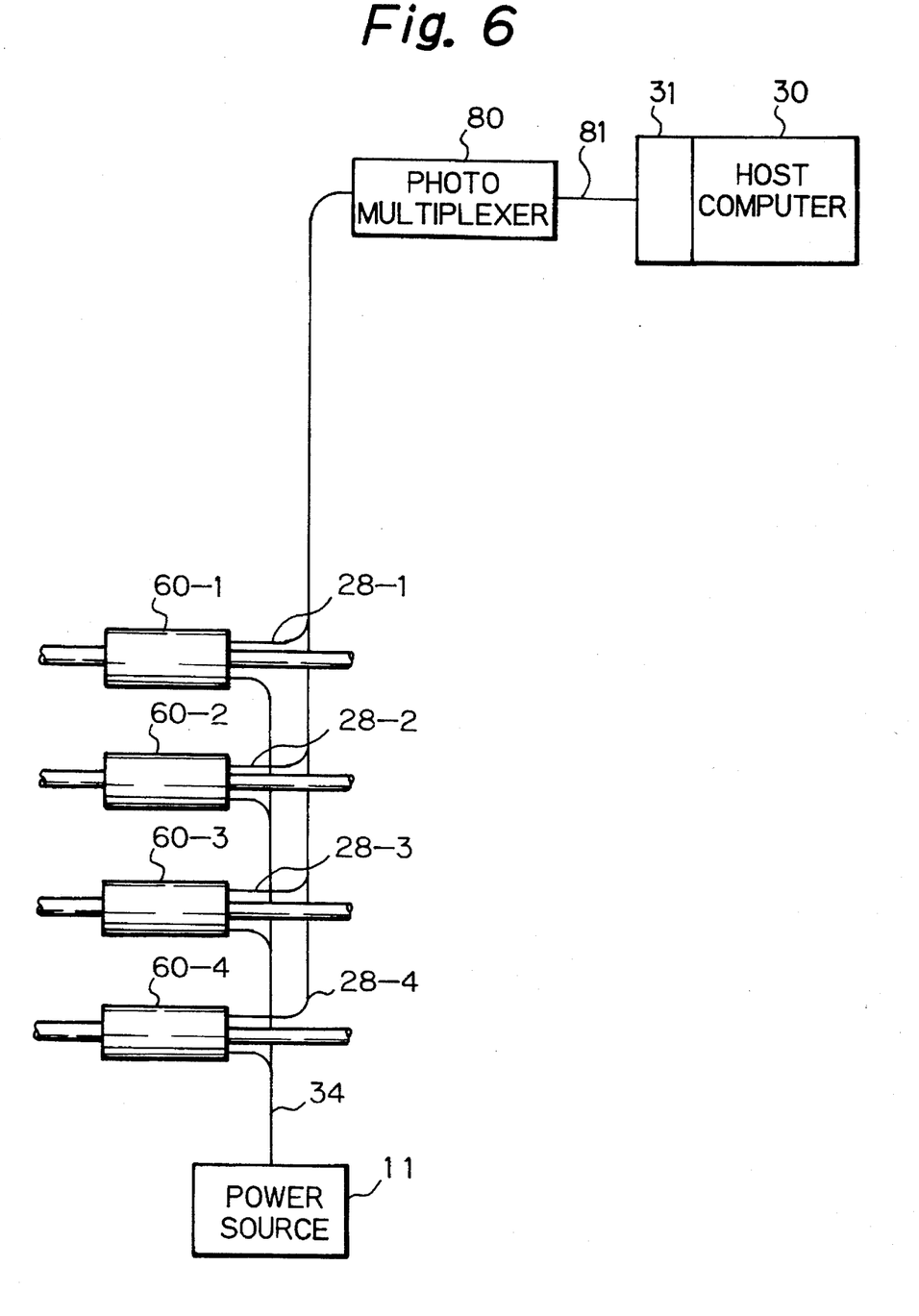
FIG. 6 is a block diagram of the mass flow control system consisting of a plurality of the mass flow controllers according to the present invention.

FIG. 6 shows the mass flow control system consisting of four mass flow controllers according to the present invention. Mass flow controllers 60-1, 60-2, 60-3 and 60-4 are connected to a photomultiplexer 80 by optical fibers 28-1, 28-2, 28-3 and 28-4, respectively. Accordingly, signals from these mass flow controllers are multiplexed by the photomultiplexer 80 and provided thereby to a host computer 30 through an optical fiber 81 and a connector 31. A multiplexed signal from the host computer 30 is transmitted through the connector 31 and the optical fiber 81 to the photomultiplexer 80, by which it is demultiplexed and sent out to the corresponding optical fibers 28-1, 28-2, 28-3 and 28-4 to be provided to the respective mass flow controllers 60-1, 60-2, 60-3 and 60-4.

While in the embodiment of the present invention shown in FIG. 6 the photomultiplexer 80 and the host computer 30 are connected by means of the optical fiber 81, in another embodiment the photomultiplexer 80 may be provided with a photoelectric mutual transducer which is connected to the host computer 30 by an electric signal line.

While the embodiment of the present invention shown in FIG. 6 utilizes a host computer on the host computer side, it may be replaced by a terminal unit. Further, the zero adjustment command and other commands may be input manually by the operator. Further, the mass flow controller may be modified to generate zero adjustment commands at regular time intervals so as to set correction values by itself. By this modification also, stable and highly reliable operation can be secured.

What is claimed is:

1. An apparatus comprising:

an analog circuit including means for detecting a mass flow and outputting a signal corresponding to a detection, and means for controlling the flow of a fluid in accordance with a preset input and a signal from said detection means;

an analog-digital mutual converter for receiving a signal from said detection means;

means, electrically connected to said analog-digital mutual converter, for processing digital data;

a photoelectric mutual transducer for receiving information through an optical fiber and transmitting information through an optical fiber, said photoelectric mutual transducer being electrically connected to said processing means;

a first casing housing said analog circuit; and a second casing housing said analog-digital mutual converter, said processing means, and said photoelectric mutual transducer, wherein said first casing and second casing are electrically interconnected.

2. An apparatus comprising:

means for detecting a mass flow and outputting a signal corresponding to a detection;

means for controlling the flow of a fluid in accordance with a preset input and a signal from said detection means;

a photoelectric transducer for receiving a command from a host computer through an optical fiber and transmitting data to the host computer through the optical fiber;

means for correcting the signal from said detecting means in accordance with a command from a host computer and transmitting corrected data to the host computer through said photoelectric transducer and the optical fiber, said correcting means being operably connected to said photoelectric transducer;

wherein said correction means includes correction conversion tables in which correction data for several kinds of fluids is stored, for correcting, responsive to a command from the host computer, a signal corresponding to a detection in accordance with the correction data in one of said correction conversion tables corresponding to a predetermined fluid.

3. The apparatus as claimed in claim 2, further comprising:

an analog-digital mutual converter for receiving a signal from said detection means;

means, electrically connected to said analog-digital mutual converter and said photoelectric mutual transducer, for processing digital data;

a first casing housing an analog circuit including said detection means and said flow control means; and a second casing housing said photoelectric mutual transducer, said analog-digital mutual converter, and said means for processing digital data, wherein said first casing and said second casing are electrically interconnected.

4. The apparatus as claimed in claim 2, wherein said correction means includes memory means in which a signal from said detection means, when the flow of the fluid is zero, is stored as a zero correction value, for correcting the signal in response to a command.

5. The apparatus as claimed in claim 4, further comprising:

an analog-digital mutual converter for receiving a signal from said detection means;

means, electrically connected to said analog-digital mutual converter and said photoelectric mutual transducer, for processing digital data;

a first casing housing an analog circuit including said detection means and said flow control means; and a second casing housing said photoelectric mutual transducer, said analog-digital mutual converter, and said means for processing digital data, wherein said first casing and said second casing are electrically interconnected.

6. An apparatus comprising:

means for detecting a mass flow and outputting a signal corresponding to a detection;

means for controlling the flow of a fluid in accordance with a preset input and a signal from said detection means;

an analog-digital mutual converter for receiving a signal from said detection means;

a photoelectric transducer for receiving a command from a host computer through an optical fiber and transmitting data to the host computer through the optical fiber;

means for processing digital data, said processing means being electrically connected to said analog-digital mutual converter and said photoelectric mutual transducer, said processing means including means for correcting said signal in accordance with a command from the host computer and transmitting corrected data to the host computer through said photoelectric transducer and the optical fiber, wherein said correcting means is operably connected to said photoelectric transducer and includes memory means in which a signal from said detection means, when the flow of the fluid is zero, is stored as a zero correction value, for correcting the signal in response to a command;

a first casing housing an analog circuit including said detection means and said flow control means; and a second casing housing said photoelectric mutual transducer, said analog-digital mutual converter, and said processing means, wherein said first casing and said second casing are electrically interconnected.

7. An apparatus comprising:

means for detecting a mass flow and outputting a signal corresponding to a detection;

means for controlling the flow of a fluid in accordance with a preset input and a signal from said detection means;

a photoelectric transducer for receiving a command from a host computer through an optical fiber and transmitting data to the host computer through the optical fiber;

an analog-digital mutual converter for receiving a signal from said detection means;

a photoelectric transducer for receiving a command from a host computer through an optical fiber and transmitting data to the host computer through the optical fiber;

means for processing digital data, said processing means being electrically connected to said analog-digital mutual converter and said photoelectric mutual transducer, said processing means including means for correcting said signal in accordance with a command from a host computer and transmitting corrected data to the host computer through said photoelectric transducer and the optical fiber, said correcting means being operably connected to said photoelectric transducer;

a first casing housing an analog circuit including said detection means and said flow control means; and a second casing housing said photoelectric mutual transducer, said analog-digital mutual converter, and said processing means, wherein said first casing and said second casing are electrically interconnected.

\* \* \* \* \*